United States Patent [19]

Stranahan et al.

[11] E Re. 31,215

[45] Reissued Apr. 19, 1983

[54] SMOKELESS GAS FLARE WITH SPECIFIC GRAVITY GAS ANALYZER FOR REDUCTION OF NOISE

[75] Inventors: John J. Stranahan, Peru, Ind.; John C. L. Hollier, Nederland, Tex.

[73] Assignee: Texaco Inc., White Plains, N.Y.

[21] Appl. No.: 239,293

[22] Filed: Mar. 2, 1981

Related U.S. Patent Documents

Reissue of:

[64] Patent No.: 3,771,940
Issued: Nov. 13, 1973
Appl. No.: 266,794
Filed: Jun. 27, 1972

[51] Int. Cl.[3] ..... F23D 13/20

[52] U.S. Cl. ..... 431/4; 431/90; 431/202

[58] Field of Search ..... 431/4, 5, 90, 202

[56] References Cited

U.S. PATENT DOCUMENTS

| | | | |
|---|---|---|---|
| 2,761,496 | 9/1956 | Verner et al. | 431/4 |
| 2,779,399 | 1/1957 | Zink et al. | 431/90 |
| 2,891,607 | 6/1959 | Webster et al. | 431/90 |

OTHER PUBLICATIONS

German Publication, "Wasser Luft und Betrieb 11 (1967) Nr. 9", p. 514.

Ranarex Gas Analysis Instrument-Bulletin R-161, 8 pages, Ranarex Instrument Dept., The Permutit Co., 1960, 50 West 44th St., New York 36, N. Y.

Ranarex Technical Bulletin RD-103, Dec. 1958, 2 pages, The Permutit Co., 50 West 44th St., New York 36, N. Y.

*Primary Examiner*—Carroll B. Dority, Jr.

*Attorney, Agent, or Firm*—Carl G. Ries; Jack H. Park; Theron H. Nichols

[57] ABSTRACT

A method and at least one gas flare for carrying out or practicing the method are disclosed for smokeless burning of undesired gas. Combined with a steam aspirating gas flare having a steam flow controller responsive to a gas flow detector to provide a combustible material is a specific gravity analyzer for controlling the steam flow controller further in relation to the specific gravity of the gas to be burned for providing a smokeless air-to-gas burning mixture in the flare with less steam usage and reduced noise.

11 Claims, 1 Drawing Figure

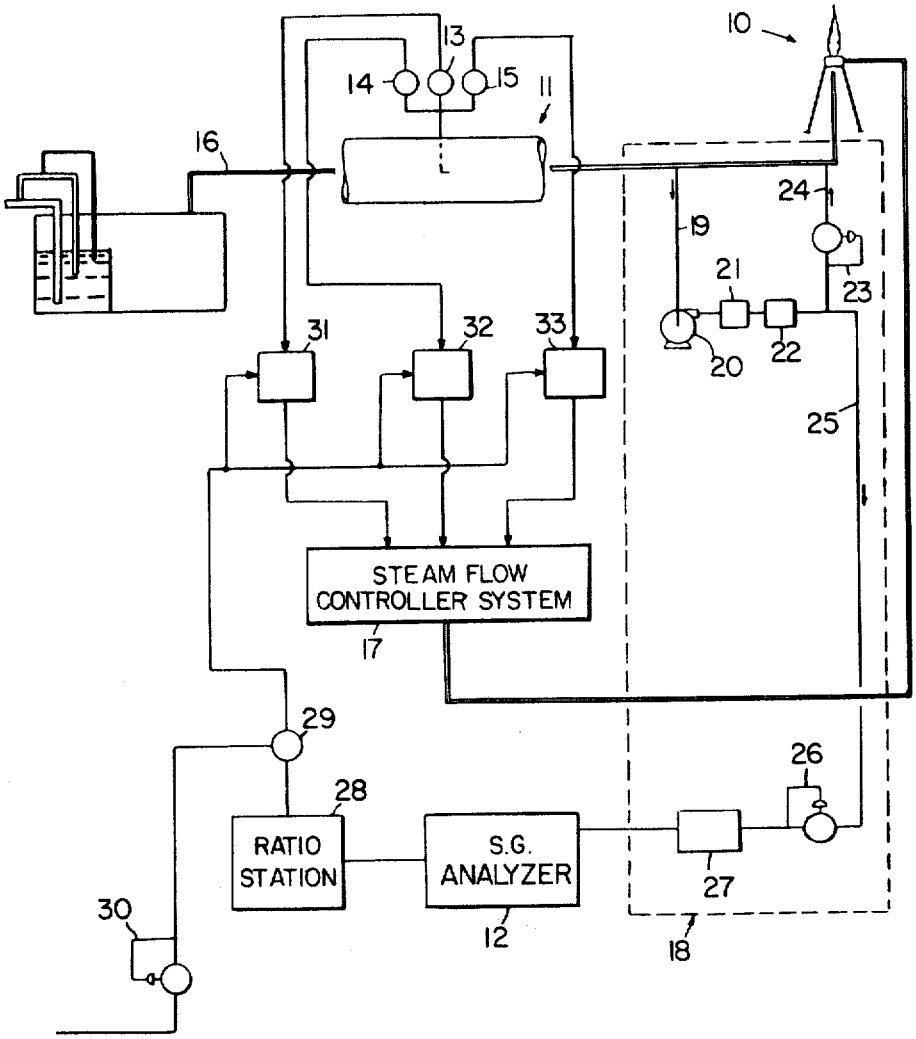
10
13
14
15
11
16
24
19
21
23
20
22
31
32
33
25
STEAM FLOW
CONTROLLER SYSTEM
17
29
26
28
RATIO
STATION
S.G.
ANALYZER
27
30
12
18

SMOKELESS GAS FLARE WITH SPECIFIC GRAVITY GAS ANALYZER FOR REDUCTION OF NOISE

Matter enclosed in heavy brackets [ ] appears in the original patent but forms no part of this reissue specification; matter printed in italics indicates the additions made by reissue.

BACKGROUND OF THE INVENTION

The government requires the burning of all excess gases being admitted to the atmosphere. The collection of these gases is normally put into a flare line which is equipped with a pilot light to ensure the burning of all gases.

Recent regulations require that this burning be smokeless in order to reduce air pollution and to be quieter to reduce noise pollution.

In order to keep a flare smokeless, as a steam aspirating gas flare for example, the relative amount of steam used to draw in air for mixing with the gas must be increased greatly as the average molecular weight of the hydrocarbon increases. Accordingly in operation, it has been necessary to set the steam-to-gas ratio high in order to maintain the flare smokeless when the highest molecular weight gas is being supplied to the flare. Thus when a low molecular weight material, such as low purity hydrogen is going to the flare, the flare is noisy due to the roar of the steam jet in the aspirating flare nozzle. It often can be heard from 2 to 10 miles away.

OBJECTS OF THE INVENTION

Accordingly, a primary object of this invention is to provide a method for burning unwanted hydrocarbons in a steam aspirating flare smokelessly, with less steam wastage, and with reduced noise levels.

A further object of this invention is to provide a method for controlling a steam aspirating gas flare for maintaining the flare smokeless with less steam usage and with reduced noise for all gases, from the lightest to the heaviest molecular weight gases.

A still further object of this invention is to provide a method for smokeless burning of undesired gas with reduced noise to vary the amount of air in the air-to-gas mixture relative to the specific gravity of the gas to be burned.

Another primary object of this invention is to provide a gas flare for carrying out or practicing the method of the invention for burning undesired gas.

Still another object of this invention is to provide a steam aspirating gas flare that varies the amount of steam to the flare nozzle relative to the specific gravity of the gas to be burned for providing a smokeless air-to-gas burning mixture in the flare with less steam usage and reduced noise.

A further object of this invention is to provide a steam aspirating gas flare that has a steam flow controller responsive to a specific gravity analyzer for providing a smokeless flare utilizing the least steam possible for reducing noise.

Another object of this invention is to provide a gas flare for efficiently and smokelessly burning undesired gas having a wide range of molecular weight with less steam usage and reduced noise.

Still another object of this invention is to provide a smokeless flare that is easy to operate, is of simple configuration, and is economical to form and assemble.

Other objects and various advantages of the disclosed method and smokeless flare for carrying out the method will be apparent from the following detailed description together with the accompanying drawing, submitted for purposes of illustration only, and not intended to define the scope of the invention, reference being had for that purpose to the subjoined claims.

The drawing diagrammatically illustrates by way of example, not by way of limitation, a smokeless flare.

BRIEF DESCRIPTION OF THE DRAWING

The FIGURE is a schematic diagram of a steam aspirating gas flare utilizing a specific gravity analyzer for forming an efficient smokeless flare with parts in section.

METHOD OF MAINTAINING A GAS FLARE SMOKELESS WITH REDUCED NOISE

This invention comprises a method for maintaining a gas flare smokeless, and particularly with reduced noise when utilizing an aspirating steam nozzle and when the molecular weight of the hydrocarbon varies. Accordingly, in operation it is necessary to adjust the steam-to-gas ratio high to keep the flare smokeless when the highest molecular weight gas is going to the flame. Then when a lower molecular weight gas, such as low purity hydrogen is being supplied to the flare, it is very noisy. A method for reducing this noise in a steam aspirating flare comprises the steps:

a. determining the specific gravity of the gas being burned, and b. varying the amount of steam to the flare relatively to the specific gravity of the gas to be burned for providing a smokeless air-to-gas burning mixture in the flare with less steam usage and reduced noise.

In greater detail the method comprises the additional steps:

c. determining the amount of steam required to maintain a desired steam-to-gas ratio for the flare gas flow, and d. multiplying the amount of steam supplied by a factor relative to the specific gravity of the gas to be burned to provide a smokeless air-to-gas burning mixture in the flare with less noise.

The last step above may be recited in greater detail as the step:

e. varying the amount of steam in the steam-to-gas ratio in proportion to the specific gravity of the gas for providing a smokeless air-to-gas burning mixture in the flare with less steam and reduced noise.

In a high pressure gas aspirating flare the method comprises the steps:

a. determining the specific gravity of the gas to be burned, and b. varying the amount of high pressure aspirating gas to the flare relative to the specific gravity of the gas to be burned for providing a smokeless air-to-gas burning mixture in the flare with less high pressure gas usage and reduced noise.

DESCRIPTION OF THE PREFERRED EMBODIMENT

The invention disclosed herein, the scope of which being defined in the appended claims is not limited in its application to details of construction and arrangement of parts shown and described, since the invention is capable of other embodiments and of being practiced or carried out in various other ways, Also it is to be understood that the phraseology or terminology employed herein is for the purpose of description and not of limitation.

The FIGURE discloses at least one steam aspirating gas flare 10, a flare control system 11, and a specific gravity analyzer 12 designed for carrying out or practicing the method of maintaining a smokeless flame in the flare 10 with less steam usage and reduced noise. The flare control system 11 may be a conventional system or like one disclosed in assignee's Pat. application Ser. No. 192,453, filed Oct. 26, 1971, entitled "Smokeless Gas Flare", *now Pat. No. 3,829,275,* which comprises two portions, one portion for very low gas flow rates in which the rate is too low for accurate measuring and a second portion for all other varying flow rates. The present invention comprises also an article for carrying out or practicing the method in the form of a specific gravity analyzer combined with a steam and gas control system to form the new and superior gas flare.

IMPROVED GAS FLARE SYSTEM

The flare 10 comprises a conventional steam aspirating gas flare in which steam, or any other gas, is blown through an aspirating nozzle to pull in air for mixing with the unwanted gas to be burned in the atmosphere. A preferred gas flare is disclosed in assignee's above-mentioned patent application wherein the steam is controlled through a steam control system for the various flow rates of gas flow to provide the proper steam-to-gas ratio for each gas flow rate for accordingly producing the correct air-to-gas mixture in the flare burner to ensure a smokeless flame.

The new flare control system 11 comprises three flow rate detectors and transmitters 13, 14, and 15 which are conventional or like those disclosed in assignee's above-identified patent application for detecting the flow rate of the gas in the main line 16. Previously, this flow rate information was transmitted straight to the steam flow controllers in the steam control system 17 for varying the steam in proportion to the gas flow rate for supplying to the flare for providing a smokeless air-to-gas burning mixture therein. Steam control system 17 is conventional or as disclosed in assignee's above-identified patent application.

A conventional specific gravity analyzer 12 *of the torque type for generating a conditioned output signal,* such as but not limited to the "Ranarex" by Pfaudler Inc., New York, N.Y., has a specific gravity gas sample conditioner portion 18 having a continuous circulating system including an input line 19 from the gas main line between the flow rate detectors 13–15 and the flare 10, compressor 20, filter 21, and coalescer 22, all for compressing and drying the gas. A back-pressure regulator 23 is on return line 24 to the gas main line 16. A gas slip-stream in line 25 is bled off the circulating system to a gas reducing valve 26, and a rotor-meter 27 for introducing the same volume of pressurized gas as air to the conventional specific gravity analyzer 12. A ratio station 28 for multiplying the specific gravity output of 3–15 psi (pounds per square inch) for example by a factor between 0.7 and 1.7 is connected between the specific gravity analyzer 12 and a high pressure select relay 29, the latter relay choosing the larger signal between the gas ratio station output signal and a 3 psi air pressure output from air reducing valve 30 for providing a further multiplying factor to control three variable ratio controllers, such as but not limited to, pneumatic set ratios 31, 32, and 33. While only three pneumatic set ratios are shown, any number may be utilized, depending on the number of flow transmitters required for the particular design of the steam control system. With the latter ratios connected between the gas flow detectors 13–15 and the steam flow controller system 17, the pneumatic set ratios 31–33 multiply the output signals from the respective flow detectors by a factor relative to the specific gravity of the gas to be burned as relayed through high pressure select ratio 29 and ratio station 28 from the specific gravity analyzer 12.

OPERATION

In the disclosed smokeless steam aspirating gas flare where the steam is supplied to the aspirating flare nozzle in proportion to the gas flow, this steam flow is further controlled in proportion to the specific gravity of the gas to be burned.

In greater detail, as the gas to be burned flows through the gas main line to the flare, a continuous conditioning of a gas sample is performed by portion 18 of the specific gravity analyzer before being processed through the specific gravity analyzer main portion 12. A signal proportioned to the specific gravity of the gas is transmitted to the pneumatic ratios 31–33 via ratio station 28 and high pressure select relay 29 for conditioning and amplifying the output signal from the specific gravity analyzer 12. Here the steam control signals [form] *from* the gas flow detectors 13–15 which are proportional to the gas flow in the main line 16 are modified further in proportion to the specific gravity of the hydrocarbon or gas to be burned for controlling the steam flow controllers in the steam flow control system 17 for decreasing the steam flow or steam-to-gas ratio for light hydrocarbons, for example, for ensuring a smokeless air-to-gas burning mixture in the flare 10 with less steam used and accordingly reduced noise.

Thus a method and at least one mechanism for carrying out or practicing the method is disclosed for smokeless burning of undesired gas in a steam aspirating flare with less steam usage and reduced noise in a manner which meets each of the objects set forth above.

While a method and a smokeless gas flare with less steam usage and reduced noise for carrying out the method of the invention have been disclosed in the accompanying specification and drawing, it will be evident that various other methods and modifications are possible in the arrangement and construction of the disclosed smokeless flare with less steam usage and reduced noise without departing from the scope of the invention, and it is accordingly desired to comprehend within the purview of this invention such methods and modifications as may be considered to fall within the scope of the appended claims.

We claim:

1. A method for smokelessly burning gas with less noise in a steam aspirating flare having means for controlling the amount of steam to the flare for controlling the amount of air drawn in for mixing with the gas for burning, comprising the steps of, a. determining the specific gravity of the gas being burned *with a torque type specific gravity analyzer,* and b. varying the amount of steam to the flare relative to the specific gravity of the gas to be burned *by*

*means including a ratio station means receiving a signal from said torque type specific gravity analyzer* for providing a *conditioned* smokeless air-to-gas burning mixture in the flare with less steam usage and reduced noise.

2. A method as recited in claim 1 including the additional steps of,

A. varying the amount of steam relative to the amount of gas flowing to the flare[, and] *with variable ratio controller means*

[b. varying the first amount of steam to a second amount of steam relative to the specific gravity of the gas to be burned] for providing [a] *the* smokeless air-to-gas burning mixture in the flare with less steam usage and reduced noise.

3. A method as recited in claim 1 wherein the second step comprises further, a. determining the amount of steam required to maintain a desired steam-to-gas ratio for the flare for the particular amount of gas flow, and b. multiplying *with said ratio station means* the amount of steam supplied by a factor relative to the specific gravity of the gas for providing the smokeless air-to-gas burning mixture in the flare with less noise.

[4. A method as recited in claim 1 wherein the second step comprises further, a. determining the amount of steam required to maintain a desired steam-to-gas ratio for the flare gas flow, and b. varying the steam-to-gas ratio relatively to the specific gravity for providing a smokeless air-to-gas burning mixture in the flare with less noise.]

5. A method for smokelessly burning gas with less noise in a high pressure gas aspirating flare having means for controlling the amount of high pressure gas to the aspirating flare for controlling the amount of air drawn in for mixing with the gas to be burned, comprising the steps of, a. determining the specific gravity of the gas to be burned *with a torque type specific gravity analyzer*, and b. varying *with a ratio varying means* the amount of [high pressure] aspirating gas to the flare relative to [the specific gravity of the gas to be burned] *a signal from said torque type specific gravity analyzer* for providing a *conditioned* smokeless air-to-gas burning mixture in the flare with less high pressure gas usage and reduced noise.

6. A method for smokelessly burning gas with less noise in a steam aspirating flare having means for controlling the steam-to-gas ratio in the flare comprising the steps of, a. determining a first steam-to-gas ratio relative to the amount of gas flow to the flare, b. determining the specific gravity of the gas to be burned *with a torque type specific gravity analyzer*, and c. varying *with variable ratio controller means* the first steam-to-gas ratio relative to the specific gravity of the gas *as indicated by a signal from said torque type specific gravity analyzer* to provide a *conditioned* smokeless air-to-gas burning mixture in the flare with less steam usage and reduced noise.

[7. A method as recited in claim 6 wherein the last step comprises further, a. varying the amount of steam in the steam-to-gas ratio in relation to the specific gravity of the gas to be burned.]

[8. A method as recited in claim 6 wherein the last step comprises further, a. varying the amount of steam in the steam-to-gas ratio in proportion to the specific gravity of the gas to be burned.]

[9. A method as recited in claim 6 wherein the last step comprises further, a. varying the amount of steam in the steam-to-gas ratio in substantially direct proportion to the specific gravity of the gas to be burned.]

10. A steam aspirating gas flare for smokeless burning with less noise of undesired gas comprising, a. *torque type* specific gravity analyzer means for determining the specific gravity of the gas to be burned, b. steam flow controller means *responsive to a variable ratio controller* for controlling the steam-to-gas mixture supplied to the flare, and c. said steam flow controller means *being* responsive to said *torque type* specific gravity analyzer means *and said variable ratio controller* for varying the steam relative to the specific gravity of the gas to be burned for providing a *conditioned* smokeless air-to-gas burning mixture in the flare with less steam usage and reduced noise.

[11. A flare as recited in claim 10 wherein, a. said specific gravity analyzer means comprises means for continuously analyzing the gas prior to being supplied to the flare for burning.]

12. A flare as recited in claim 10 wherein the gas is supplied to the flare through a main line and wherein, a. said specific gravity analyzer means comprises a *torque type* specific gravity analyzer connected to the main line for continuously circulating the gas from the main line, through the *torque type* specific gravity analyzer[, and back to the main line for continuous analyzing of the gas prior to being burned in the flare].

13. A [flare as recited in claim 10 including further,] *steam aspirating gas flare for smokeless burning with less noise of undesired gas comprising,*

*(a) torque type specific gravity analyzer means for determining the specific gravity of the gas to be burned,*

*(b) steam flow controller means including ratio varying means,*

[a.] *(c) said* ratio varying means for varying the steam-to-gas mixture output of said steam flow controller, and

[b.] *(d)* said ratio varying means being responsive to said gas *torque type* specific gravity analyzer means for controlling said steam flow controller means for controlling the steam-to-gas mixture relative to the specific gravity of the gas being burned *for providing a conditioned smokeless air-to-gas burning mixture in the flare with less steam usage and reduced noise.*

[14. A flare as recited in claim 10 wherein, a. said steam flow controller means has a first output steam-to-gas mixture ratio relative to the amount of gas flow to the flare, and b. said steam flow controller means is responsive to said specific gravity analyzer means for varying said first output by varying the steam relative to the specific gravity of the gas to be burned.]

[15. A flare as recited in claim 10 wherein, a. said steam flow controller means has a steam output relative to the amount of gas flow to the flare, and b. said steam flow controller means is responsive to said specific gravity analyzer means for further varying said first output relative to the specific gravity of the gas to be burned.]

[16. A flare as recited in claim 15 wherein, a. said steam flow controller means is responsive to said specific gravity analyzer means for varying said first output in proportion to the specific gravity of the gas to be burned.]

[17. A flare as recited in claim 15 wherein, a. said steam flow controller means is responsive to said specific gravity analyzer means for varying said first output in direct proportion to the specific gravity of the gas to be burned.]

18. A [flare as recited in claim 15 wherein] *steam aspirating gas flare for smokeless burning with less noise of undesired gas comprising,*

*(a) torque type specific gravity analyzer means for determining the specific gravity of the gas to be burned,*

*(b) steam flow controller means responsive to a variable ratio controller for controlling the steam-to-gas mixture supplied to the flare,*

*(c) said steam flow controller means being responsive to said torque type specific gravity analyzer means and said variable ratio controller means for varying the steam relative to the gas to be burned for providing a conditioned smokeless air-to-gas burning mixture in the flare with less steam usage and reduced noise,*

*(d) said steam flow controller means has a first steam output relative to the amount of gas flow to the flare,*

*(e) said steam flow controller means being responsive to said torque type specific gravity analyzer means and said variable ratio controller means and a means for further varying said steam relative to the specific gravity of the gas to be burned,*

[a.] *(f)* said flare has steam multiplier means, and [b.] *(g)* said steam flow controller means [is] *being* responsive to said steam multiplier means for multiplying the steam first output by a factor relative to the specific gravity of the gas to be burned.

19. A steam aspirating gas flare for burning undesired gas having a steam flow controller comprising, a. a main gas line connected to the flare, b. a *torque type* specific gravity analyzer connected to said main gas line having a [n] *conditioned* output, c. a gas flow detector connected between said main gas line and a steam flow controller having an output signal for controlling the steam flow relative to the gas flow, d. a variable ratio controller connected between said gas flow detector and the steam flow controller, and e. said variable ratio controller being responsive to said *torque type* specific gravity analyzer output for modifying said gas flow detector control signal to said steam flow controller for ensuring smokeless burning of the undesired gas with less steam usage and reduced noise.

20. A flare as recited in claim 19 wherein, a. said variable ratio controller multiplies said gas flow detector output by the *torque type* specific gravity analyzer *conditioned* output for ensuring smokeless burning of the undesired gas with less noise.

* * * * *